Figure 1:
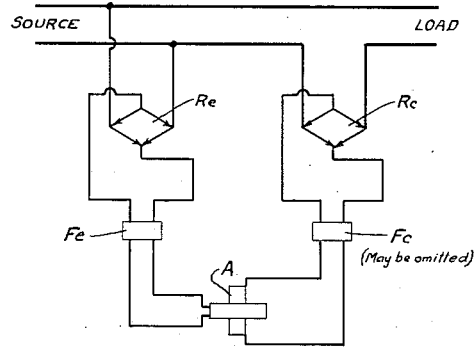

June 27, 1933.    W. R. SCHNEIDER    1,915,581
VOLT-AMPERE RESPONSIVE APPARATUS
Filed Aug. 29, 1928    2 Sheets-Sheet 1

INVENTOR.
William R. Schneider.
BY
Townsend, Loftus & Abbett
ATTORNEYS.

June 27, 1933. W. R. SCHNEIDER 1,915,581
VOLT-AMPERE RESPONSIVE APPARATUS
Filed Aug. 29, 1928  2 Sheets-Sheet 2

INVENTOR.
William R. Schneider.

BY
Townsend, Loftus & Abbett
ATTORNEYS.

Patented June 27, 1933

1,915,581

UNITED STATES PATENT OFFICE

WILLIAM R. SCHNEIDER, OF BERKELEY, CALIFORNIA, ASSIGNOR OF ONE-FOURTH TO WILLIAM H. ATKINSON, OF SAN FRANCISCO, CALIFORNIA

VOLT-AMPERE RESPONSIVE APPARATUS

Application filed August 29, 1928. Serial No. 302,671.

My present invention relates to electrical measuring apparatus and more particularly to apparatus for measuring and/or operating in response to the volt-amperes of an electrical circuit.

At the present time in alternating current power circuits, the most common devices of the character contemplated now in use operate in response to a torque which is proportional to the watts or the reactive volt-amperes of the line. In other words, the operation of these devices is at all times influenced by the power factor resulting from a displacement of the current with respect to the voltage so that operation in response to the volt-amperes of a circuit of this type is impossible without providing some means to compensate for the power factor.

The various methods adopted heretofore to determine the volt-amperes of an alternating current circuit have required either the calculation of the volt-amperes from the reactive and power components of the circuit as found by measurements made with suitable electrical instruments, the use of various mechanical devices to perform this operation automatically by means of pantograph, moving pens, charts, rotating spheres, etc., or by the mechanical shifting of the positions of the various electrical circuits with respect to one another so as to compensate for the changes of power factor of the circuit.

The mechanical devices above referred to are of necessity very complicated and expensive and it is therefore an object of my invention to provide a means whereby an operation of suitable devices in response to the volt-amperes of an alternating current circuit may be had in a direct manner without resort to the above expedients.

Another object of my invention is to provide apparatus whereby the volt-amperes of a plurality of phases of a polyphase alternating current circuit may be totalized on a single device.

A further object of my invention is to provide means whereby the volt-amperes of a plurality of separate alternating current circuits may be totalized on a single instrument.

It is also an object of my invention to provide an apparatus whereby the effect of the volt-amperes of both alternating current and direct current circuits may be totalized upon a single instrument or device.

My invention may be described briefly as contemplating the provision of electro-responsive apparatus which will operate in response to the actual volt-amperes of an alternating current circuit irrespective of the power factor of the latter by a novel arrangement of rectifiers, whereby the effect of phase displacement between the voltage and current of the circuit upon the apparatus will be eliminated.

A further aspect of my invention contemplates in combination with the above rectifiers, the provision of filters in one or more of the circuits for the purpose of producing a substantially uniform torque throughout the cycle of operation of the device, as will hereinafter appear.

For a better understanding of my invention, reference should be had to the accompanying drawings, wherein—

Figure 2:
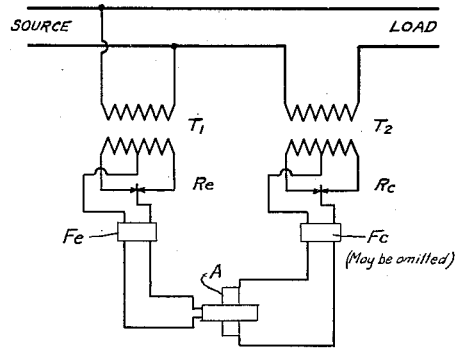
Figure 3:
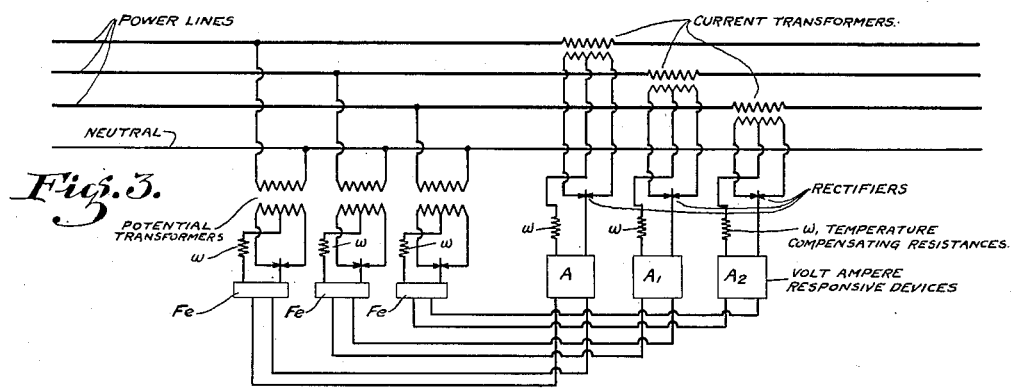
Figure 4:
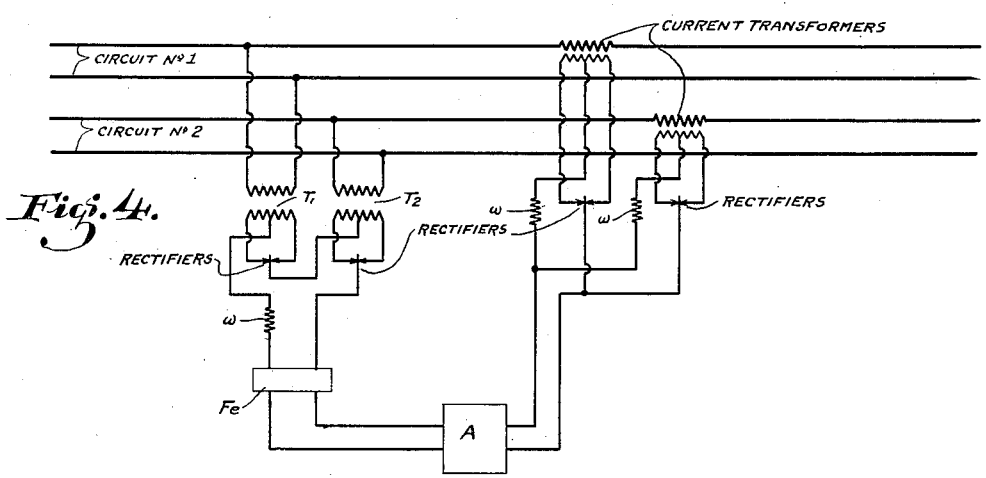
Figure 5:
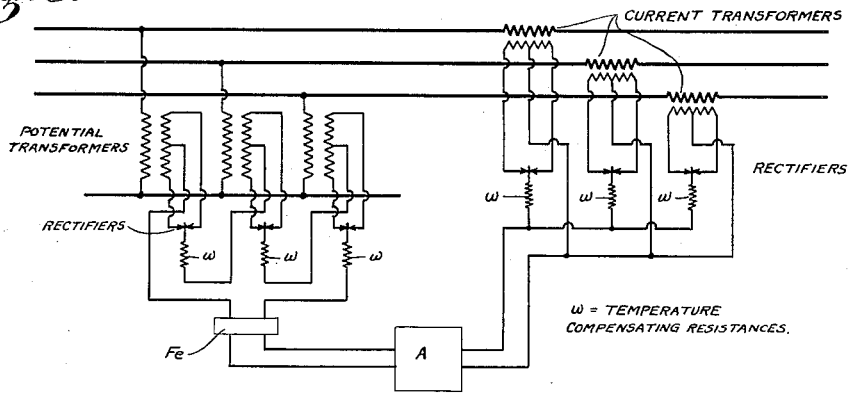

Figure 1 is a schematic wiring diagram showing a volt-ampere device and rectifiers applied directly to a single phase alternating current circuit, Figure 2 is a similar view showing a volt-ampere device and rectifiers coupled by means of transformers to a single phase alternating current circuit, Figure 3 shows a plurality of devices and rectifiers as applied to a polyphase alternating current circuit, Figure 4 shows another aspect of my invention as applied to two distinct and separate alternating current circuits, Figure 5 shows schematically a further aspect of my invention as applied to a polyphase alternating current circuit, and Figures 6, 7, 8, and 9 are diagrammatic curves illustrating certain characteristics involved in the explanation of my invention.

In Figures 1 and 2 I show a volt-ampere device as applied to a single phase alternating current circuit. The choice of a single phase circuit in these illustrations is for the purpose of simplifying the explanation of my invention and it should be understood that my invention is equally applicable to circuits having a number of phases in which different types of polyphase connections are made. In Figure 1 I show a device A which may be an indicating or integrating wattmeter or other device having a potential coil and a current coil arranged in accordance with long established practice in devices of this kind. The potential coil of the device A is shown as connected across the circuit through a full wave rectifier $R_e$ which is preferably of the recently developed oxide type. It should be understood, however, that any suitable type of rectifier can be used in this connection. The rectified potential from the rectifier $R_e$ is then passed through a filter $F_e$ and the current coil of the device A is connected in one of the lines of the circuit through a second rectifier $R_c$ of a type similar to that just described. This rectified current is shown as passed through a second filter $F_c$. It should be understood here that the use of two filters, as shown, is not absolutely necessary as a single filter, preferably one in the potential circuit, will, as will be hereinafter pointed out, produce the results sought sufficiently well for all ordinary conditions of operation. In this connection it might be said that, inasmuch as the current in the potential circuit in most cases found in practice is practically uniform, the potential losses of the filter can be easily compensated for and I therefore choose this circuit for the filter when only one filter is used.

In Figure 2 I show the volt-ampere device as connected to a single phase alternating current circuit by means of suitable transformers $T_1$ and $T_2$. In this scheme of connections, it will be seen that full wave rectification is obtained by providing a neutral tap in the secondary of the transformers $T_1$ and $T_2$ with the use of only two rectifier elements. The current from the two rectifier elements $R_e$ and $R_c$ is here illustrated as also passing through filters $F_e$ and $F_c$, respectively, to the potential and current coils of the device A. While I have illustrated in these two figures of the drawings connections which produce full wave rectification, it should be understood that half wave rectification may in some cases be used with advantage. The application of half wave rectification to the system involved in my invention is, however, subject to the following disadvantages:

(1) It is more difficult to produce a uniform direct current for the elements of a meter as shown than is the case when full wave rectification is used;

(2) When used directly in the load circuit, the load will be supplied with a uni-directional current during one-half of each cycle and be open-circuited during the following half cycle;

(3) In the case given in (2), the rectifier must be capable of withstanding the maximum line potential during the half cycle when the load circuit is opened by the rectifier;

(4) When used in the secondary of a current transformer, the rectifier must be capable of withstanding the maximum open circuit voltage of the transformer; and (5) When used as given in (4) even harmonics will be introduced into the alternating current load circuit.

The particular type of rectifier applicable to my invention as previously stated is not important, but for simplicity, minimum cost of maintenance, and uniformity of operation under various operating conditions, a dry type of rectifier is preferable. Rectifiers of this type are now produced which have capacities suitable for carrying the currents involved in my invention. These rectifiers are generally comprised of two or four asymetric units, each comprising a metallic member such as a copper or iron plate having a coating of a compound such as an oxide of the metal formed directly thereon. The construction of these rectifiers is well known by those skilled in the art and a further description thereof is not thought necessary.

In Figure 3 I have shown the last above system of connections as applied to a three-phase Y connected alternating current power circuit and for the purpose of explanation I shall assume that the devices A, $A_1$, and $A_2$ are indicating wattmeters. It should be understood, however, that any type of device which will respond to the rectified alternating current volt-amperes may be used.

Such responsive devices include:

Indicating wattmeters
    Integrating watt hour meters
    Relays
    Demand meters, etc.

These instruments may operate on any of the principles well known in direct current apparatus such as:

Electro-magnetic
    Electro-chemical
    Thermal
    Electro-mechanical, etc.

When the devices A, $A_1$, and $A_2$ are connected as shown, they will indicate volt-amperes actually flowing in the different phases of the circuit and by merely adding the three, the total volt-amperes of the circuit may be readily obtained. In this system of connections the potential circuits of the elements A, $A_1$, and $A_2$ are connected through the rectifiers and filters, as previously described, between the neutral of the line and the different line conductors and the current coils are connected by means of suitable transformers with each of the power lines. In this embodiment of my invention I have omitted the filters $F_c$. It should also be noted here that I have provided in this system suitable resistances $w$, which are connected in series with the rectifiers for the purpose of compensating for the temperature changes in the rectifiers, windings, etc. Resistances of this type are well known in the metering art.

In Figure 4 I show my invention as applied to two distinct single phase alternating current power circuits which I have designated as circuits No. 1 and No. 2. When the various circuits are properly insulated from one another, one meter of the above described type, designated as A in this figure of the drawings, may be used as a totalizing meter to give a measure of the total volt-amperes of two or more independent circuits. In this figure of the drawings it will be seen that the potential characteristics of the two lines are connected through transformers $T_1$ and $T_2$ so that the sum total of the two, when rectified, will be impressed upon the potential coil of the device A. It will also be seen that the current characteristics of the two separate lines are also connected through suitable current transformers so that the sum of their rectified currents will be impressed on the current coil of the device A. It should be pointed out that the two circuits here shown need not be of the same frequency, as the frequency characteristics of the power lines will be entirely eliminated by the rectifiers. As a result of this condition, it will further be seen that the volt-amperes of one or more, if properly insulated, direct current circuits may also be superimposed on the same device A together with the rectified currents of alternating current circuits.

In Figure 5, I show an arrangement of apparatus wherein the volt-amperes of the different phases of a three-phase Y connected circuit may be superimposed upon a single device A so as to produce a totalized reading of the volt-amperes of the different phases of the circuit. The totalizing device designated as A may be any one of the devices previously enumerated as applicable to my invention. In this particular scheme of connections it will be noted that the rectified potential circuits are connected in series through a suitable filter $F_e$ to the potential coil of the device A and that the rectified currents are connected in parallel to the current coil of the device A.

In view of the fact that the potential and current characteristics of the power circuit are rectified before being sent through the apparatus A, I have discovered that the potential and current need not be of the same frequency and, as a result, my invention may be utilized in the construction of a sensitive neutral or residual current relay to operate in the neutral of a balanced polyphase circuit. Such a relay will have its potential circuit excited through a suitable rectifier as above described from one of the power lines at fundamental frequency and the current element will be excited by the rectified neutral current consisting principally of the third and higher harmonics and will have a torque directly proportional to this neutral current.

In connection with the application of filters as disclosed in the above description, it is thought that a further discussion may be necessary and the following is therefore submitted in connection with Figures 6, 7, 8, and 9 of the drawings.

Figure 6:
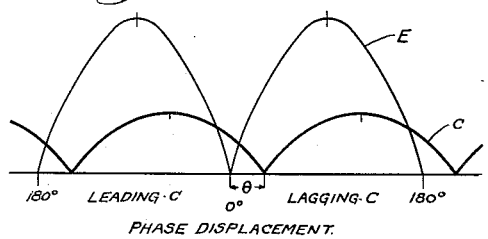
Figure 7:
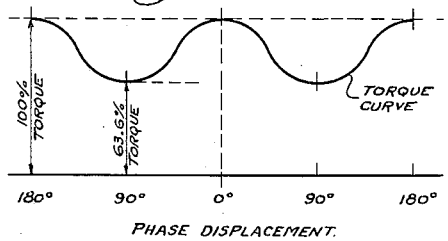
Figure 8:
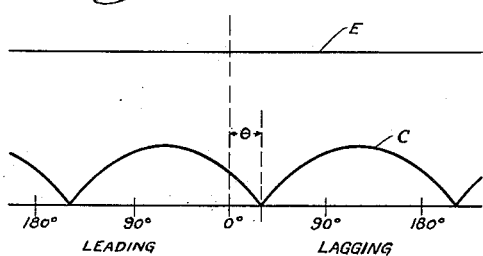
Figure 9:
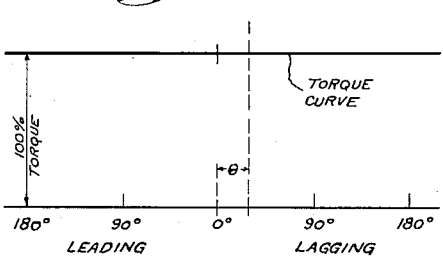

If we choose a single phase alternating current circuit having a zero degree phase angle displacement between the current and potential waves for the purpose of illustration, the rectified waves of potential and current will also have a zero degree phase displacement between them, but when the displacement between the potential and current waves of an alternating current circuit equals an angle $\theta$, the phase displacement between the rectified waves will also be $\theta$, as shown in Figure 6. In this figure, E designates the potential wave and C designates the current wave. If these rectified waves of potential and current are applied to a direct current instrument such as a wattmeter or other device, the torque produced upon the instrument will be a function of the phase angle. A typical torque curve under these conditions is shown in Figure 7, wherein the torque is shown as varying from 1.00 at zero degrees phase displacement to approximately .60 at 90° phase displacement, either leading or lagging. I have found that if the undulations of the rectified currents of either the potential or current circuit, preferably that of the potential circuit as illustrated, are reduced to a negligible value or are eliminated completely by the introduction of a suitable filter, a smooth potential curve as shown in Figure 8 may be produced. Under these conditions the variation of the phase displacement of the current C in its effect upon the torque, as illustrated in Figure 7, will be entirely eliminated and a substantially uniform potential current, as illustrated in Figure 8 will be impressed upon the devices A and, as a result, a uniform torque as illustrated in Figure 9 will result.

It is well known that the power produced by an alternating current C, at a potential E, at any instant is equal to the product of the ordinates of the two waves at that particular instant. If the phase displacement $\theta$ is zero, the average power produced during the cycle by the two rectified waves will be:

$$P_0 = \frac{1.5708}{\pi} EC = .5EC$$

As the phase displacement is increasd to 90°, the average power produced by the two rectified waves during a cycle will be:

$$P_{90} = \frac{1}{\pi} EC = .318EC$$

which is 63.6% of its value when $\theta=0°$. The power again increases to .5 $EC$ as $\theta$ increases to 180°.

In other words, as the phase displacement varies, the average power in a cycle will vary from 100% when $\theta=0°$, 180°, 360°, etc., to 63.6% when $\theta=90°, 270°, 450°$, etc., as shown in Figure 7.

If a filter is used in one of the circuits, such as the potential circuit, to reduce the undulations of the rectified wave E in Figure 6, to yield a potential wave that is practically uniform, as E in Figure 8, the variations in the average power or torque will be practically eliminated as shown by the average torque curve in Figure 9.

In connection with the use of transformers as suggested above, it might be added that the cost of the rectifiers required in the potential circuits may be reduced by providing potential transformers designed to have low voltage secondaries suitable to supply current for the operation of the devices and low voltage rectifiers.

From the above, it will be seen that I have provided a new and novel method and apparatus for obtaining a result in response to the volt-amperes of alternating current power circuits and while I have in the accompanying drawings shown by way of illustration certain embodiments of my invention, I desire to have it understood that many other variations thereof will readily suggest themselves to those skilled in the art and that I desire to cover in the appended claims all variations of my invention which fall within the spirit and scope of the appended claims.

Having thus described my invention, what I claim and desire to secure by Letters Patent is—

1. In combination with a plurality of independent alternating current power circuits, a potential element of an electro-responsive device connected through a rectifier to one of the phases of each of said power circuits, a current responsive element associated with said potential element connected through other rectifiers in series with the power line corresponding to each of the aforesaid phases, and filtering means connected between said first rectifiers and said electro-responsive device for eliminating intra-cyclic variations in the rectified current, whereby in cooperation said potential and current elements will operate in response to the total volt-amperes of the particular phases of said circuits to which the elements are connected.

2. In combination with a multiphase alternating current power circuit, an electro-responsive device having potential and current-responsive windings, a plurality of rectifiers connected across the several phases of said power circuit, connections including a filter circuit whereby the rectified voltage of each of said phases will be added and impressed free of intra-cyclic variations upon the potential winding of said electro-responsive device, a plurality of rectifiers connected in the lines of said power circuit adapted to rectify the current passing therethrough, and connections whereby the current rectified by said rectifiers will be added and impressed upon the current winding of said electro-responsive device, said potential and current-responsive windings being adapted to cooperate and respond to the total volt-amperes of said power circuit.

3. In combination with a multiphase alternating current circuit, an electro-responsive device having potential and current-responsive windings, a plurality of rectifiers connected across the phases of said power circuit, connections whereby the rectified voltage of each of said rectifiers will be added and impressed upon the potential winding of said electro-responsive device, a filter through which the rectified potential current must pass in flowing to said potential winding, a plurality of rectifiers connected in the lines of said power circuit adapted to rectify the current passing therethrough, and connections whereby the current rectified by said rectifiers will be added and impressed upon the current winding of said electro-responsive device, said potential and current-responsive windings being adapted to cooperate and respond to the total volt-amperes of said power circuit.

4. In combination with a multiphase alternating current power circuit, a volt-ampere responsive device having potential and current-responsive windings, transformers connected across the phases of said power circuit having their secondaries connected to rectifiers, connections whereby the rectified voltage of said rectifiers will be impressed upon the potential winding of said volt-ampere responsive device, a plurality of current transformers connected in the several lines of said power circuit having their secondaries connected to rectifiers, and connections including a filtering means between said transformers and the potential winding of the volt-ampere responsive device, whereby the total current output of said transformers will be impressed upon the current winding of said volt-ampere responsive device, said potential and current windings being adapted to cooperate and respond to the total volt-amperes of said power circuit.

5. In combination with a multiphase alternating current power circuit, a volt-ampere responsive device having potential and current-responsive windings, transformers connected across the several phases of said power circuit having their secondaries connected to full wave rectifiers, connections whereby the rectified voltage of said rectifiers will be impressed upon the potential winding of said volt-ampere responsive device, a filter interposed in said circuit adapted to produce a uniform current flow, a plurality of current transformers connected in the several lines of said power circuit having their secondaries connected to full wave rectifiers, and connections whereby the total current output of said transformers will be impressed upon the current winding of said volt-ampere responsive device, said potential and current windings being adapted to cooperate and respond to the total volt-amperes of said power circuit.

6. In a multiphase alternating current system, the combination of a plurality of insulated alternating current circuits, transformers connected to each of said circuits for reducing the potentials and currents of said circuits to metering values, rectifiers connected to said transformers for rectifying the transformed potentials and currents of said transformers to corresponding direct currents, a volt-ampere responsive device having potential and current windings energized by said rectified alternating potentials and currents, and a filter means interposed between at least one of said rectifiers and said volt-ampere responsive device for smoothing out intra-cyclic variations in the rectified current.

7. In a multiphase alternating current system, the combination of a plurality of alternating current circuits, transformers connected across each of said circuits for producing currents corresponding to the voltages of said circuits, transformers connected in series with said circuits for producing currents of lower value corresponding to the currents in said circuits, rectifiers connected to said transformers for rectifying the transformed potential currents and transformed currents of said transformers to corresponding direct currents, a volt-ampere responsive device having potential and current windings adapted to be energized by said rectified alternating potential currents and said rectified currents, and a filter means interposed between said potential current rectifiers and said volt-ampere responsive device for smoothing out intra-cyclic variations in the rectified potential current.

8. The method of operating a single volt-ampere device in response to the total volt-amperes of a plurality of electrical non-synchronous circuits, which comprises deriving currents from said circuits in proportion to the potentials and currents of said circuits, rectifying the derived currents of said circuits, impressing the rectified potential currents in series upon the potential winding of said volt-ampere device, impressing the rectified currents of said circuits in parallel upon the current responsive winding of said volt-ampere device, and filtering the rectified potential currents to smooth out intra-cyclic variations of current due to frequency differences in the nonsynchronous circuits.

9. The method of operating a volt-ampere device in response to the total volt-amperes of a plurality of alternating current circuits having the same or different frequencies, which comprises deriving alternating currents from said circuits proportional to the potentials and currents of said circuits, rectifying the derived currents of said circuits, impressing the rectified potential currents in series upon the potential winding of said volt-ampere device, impressing the rectified currents of said circuits in parallel upon the current responsive winding of said volt-ampere device, and providing a filtering means between the rectified potential current source and the potential winding of said device for smoothing out intra-cyclic variations in the derived potential current, whereby said device will operate in response to the total volt-amperes of said plurality of circuits irrespective of the frequency and/or power factors thereof.

10. In combination with a multiphase alternating current power system, a potential winding of an electro-responsive device connected through rectifiers to the several phases of said circuit so that the rectified voltages of said phases will be applied to said potential winding in the additive sense, a current winding associated with said potential winding and connected through other rectifiers in series with the several phases so that the rectified currents will be applied to said current winding in the additive sense, and a filter in the potential winding circuit for eliminating intra-cyclic variations, whereby in operation said potential and current windings of said device will exert a force proportional to the total volt-amperes of all the phases to which said windings are connected.

11. An apparatus responsive to the total volt-amperes of a multiphase alternating current system, comprising means for deriving from each of the phases of said system two currents which are respectively proportional to the total voltage and the total current of said phases, rectifying means for changing said two derived currents into unidirectional currents corresponding to said derived alternating currents, an electric filter for at least one of said rectified currents, and a volt-ampere responsive device having a potential and current winding energized by the corresponding unidirectional currents after at least one of said derived currents has been passed through said filter.

WILLIAM R. SCHNEIDER.